(12) United States Patent
Writt et al.

(10) Patent No.: US 7,619,776 B2
(45) Date of Patent: Nov. 17, 2009

(54) METHOD TO PRODUCE A HARDCOPY OUTPUT OF AN IMAGE FORMED AT LEAST IN PART BY PERFORATIONS

(75) Inventors: John Thomas Writt, Lexington, KY (US); Adam Jude Ahne, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 601 days.

(21) Appl. No.: 11/304,115

(22) Filed: Dec. 15, 2005

(65) Prior Publication Data

US 2007/0139713 A1    Jun. 21, 2007

(51) Int. Cl.
 *H04N 1/405* (2006.01)
(52) U.S. Cl. .................. 358/3.06; 358/3.29; 358/3.3
(58) Field of Classification Search .................. 358/1.9, 358/2.1, 3.06–3.12, 3.29–3.32
 See application file for complete search history.

(56) References Cited

U.S. PATENT DOCUMENTS

| | | | |
|---|---|---|---|
| 5,526,744 | A | 6/1996 | Meschi |
| 5,842,794 | A | 12/1998 | Zimmermann |
| 6,532,082 | B1 | 3/2003 | Dewitte |
| 6,594,026 | B2 | 7/2003 | MacDonald |

*Primary Examiner*—Thomas D Lee
*Assistant Examiner*—Stephen M Brinich
(74) *Attorney, Agent, or Firm*—Taylor & Aust

(57) ABSTRACT

A method to produce a hardcopy output of an image on an imaging medium includes providing grayscale image data representing the image; determining a perforation density for representing the image; halftoning the grayscale image data based on the perforation density to form perforation halftone data; and producing the hardcopy output of the image by perforating the imaging medium in accordance with the perforation halftone data.

22 Claims, 3 Drawing Sheets

METHOD TO PRODUCE A HARDCOPY OUTPUT OF AN IMAGE FORMED AT LEAST IN PART BY PERFORATIONS

BACKGROUND OF THE INVENTION

1. Field of the Invention

The present invention relates to an imaging apparatus, and, more particularly, to a method to produce a hardcopy output of an image formed at least in part by perforations.

2. Description of the Related Art

A typical imaging apparatus, such as a printer or an All-In-One machine (AIO), includes a print engine for forming an image on one or more sheets of print media, such as paper, using ink and/or toner. Such a print engine may be, for example, an ink jet print engine having a reciprocating printhead carrier, or an electrophotographic (e.g., laser) print engine. An AIO is a multifunction unit that is configured to perform stand alone functions, such as copying or facsimile receipt and transmission, or may be connected to a host computer via a communications link to facilitate a printing function.

One such imaging apparatus, for example, may further include a perforator unit for forming cuts or perforations in a sheet of media, such as paper. For example, a user may use the imaging apparatus to punch a series of holes around a specified area in order for the user to easily remove the area from the sheet of media.

SUMMARY OF THE INVENTION

The invention, in one exemplary embodiment, is directed to a method to produce a hardcopy output of an image on an imaging medium. The method includes providing grayscale image data representing the image; determining a perforation density for representing the image; halftoning the grayscale image data based on the perforation density to form perforation halftone data; and producing the hardcopy output of the image by perforating the imaging medium in accordance with the perforation halftone data.

The invention, in another exemplary embodiment, is directed to an imaging system configured to produce a hardcopy output of an image on an imaging medium. The imaging system includes a perforator unit for perforating the imaging medium. A device having a driver is communicatively coupled to the perforator unit. The device executes program instructions to perform the acts of receiving grayscale image data representing the image; determining a perforation density for representing the image; halftoning the grayscale image data based on the perforation density to form perforation halftone data; and producing the hardcopy output of the image by perforating the imaging medium in accordance with the perforation halftone data.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one or more embodiments of the invention, and such exemplifications are not to be construed as limiting the scope of the invention in any manner.

DETAILED DESCRIPTION OF THE INVENTION

Figure 1:
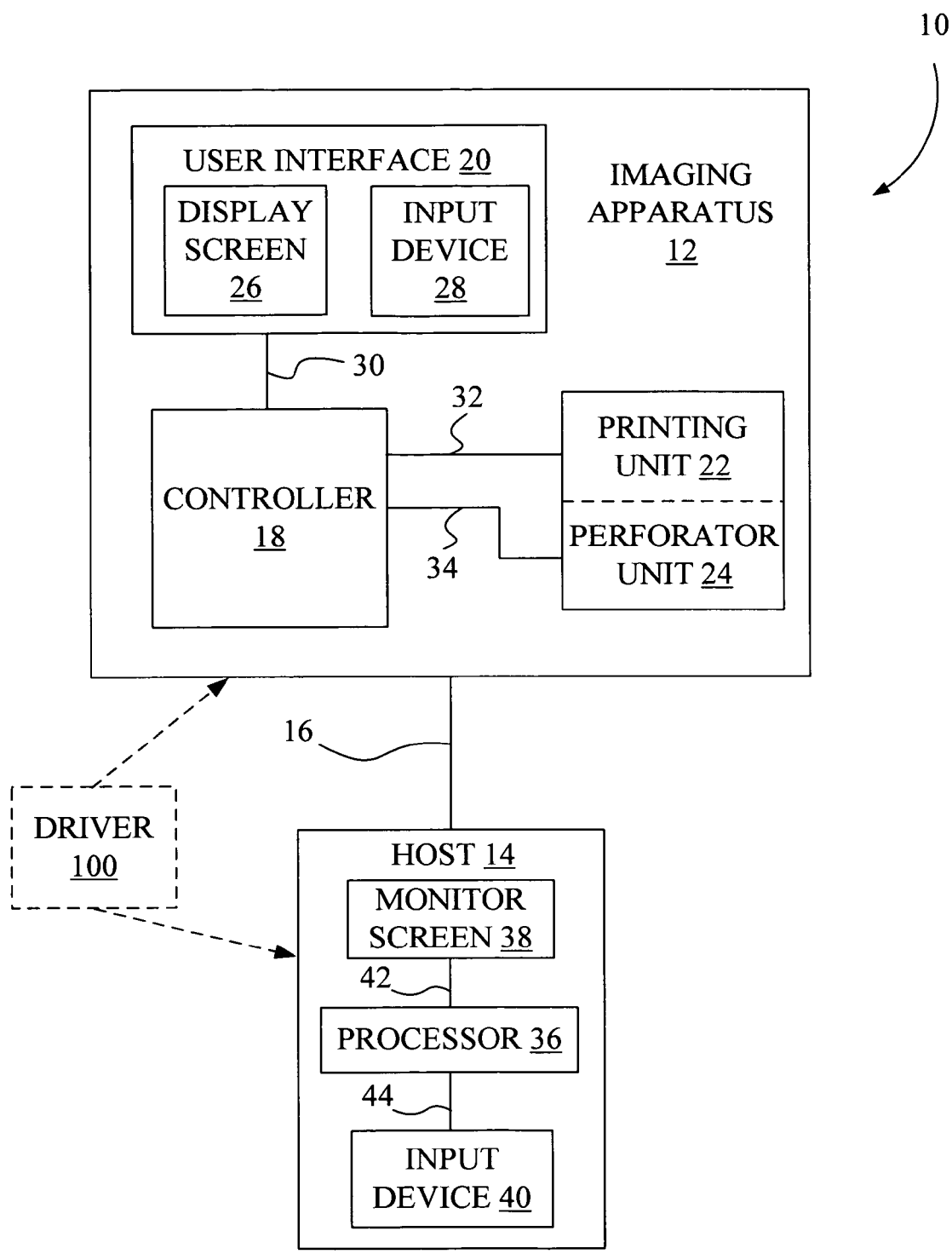
FIG. 1 is a diagrammatic representation of a system implementing the present invention.

Referring now to the drawings and particularly to FIG. 1, there is shown a system 10 embodying the present invention. System 10 includes an imaging apparatus 12, and optionally, a host 14.

Imaging apparatus 12 may be, for example, a printer, such as an ink jet printer, which in turn may form the print engine for an AIO machine, such as for example, a standalone unit that has scanning, copying, perforating, and/or faxing functionality, in addition to printing functionality. Host 14, which may be optional, may be communicatively coupled to imaging apparatus 12 via a communications link 16.

As used herein, the term "communications link" generally refers to structure that facilitates electronic communication between two components, and may operate using wired or wireless technology. Accordingly, communications link 16 may be, for example, a direct electrical wired connection, a direct wireless connection (e.g., infrared or radio frequency (r.f.)), or a network connection (wired or wireless), such as for example, an Ethernet local area network (LAN) or a wireless networking standard, such as IEEE 802.11.

In the embodiment of FIG. 1, imaging apparatus 12 includes a controller 18, a user interface 20, a printing unit 22 and a perforator unit 24. User interface 20 includes a display screen 26 and an input device 28, such as a keypad. Controller 18 is communicatively coupled to user interface 20 via a communications link 30. Controller 18 is communicatively coupled to printing unit 22 via a communications link 32. Controller 18 is communicatively coupled to perforator unit 24 via a communications link 34.

Controller 18 may be in the form of an Application Specific Integrated Circuit (ASIC) and may include a processor and associated memory for providing printing data and/or perforation data to printing unit 22 and perforator unit 24, respectively.

Printing unit 22 may be, for example, an ink jet printer having a reciprocating printhead carrier, or other suitable print engine for forming an image on a substrate, such as a sheet of paper.

Perforator unit 24 may be used for forming perforations in a sheet of media, or for forming cuts in a sheet of media, based on a desired or predetermined perforation density, which is adjustable. In the embodiment shown in FIG. 2, for example, perforator unit 24 includes a reciprocating needle assembly, and is described in further detail below.

Figure 2:
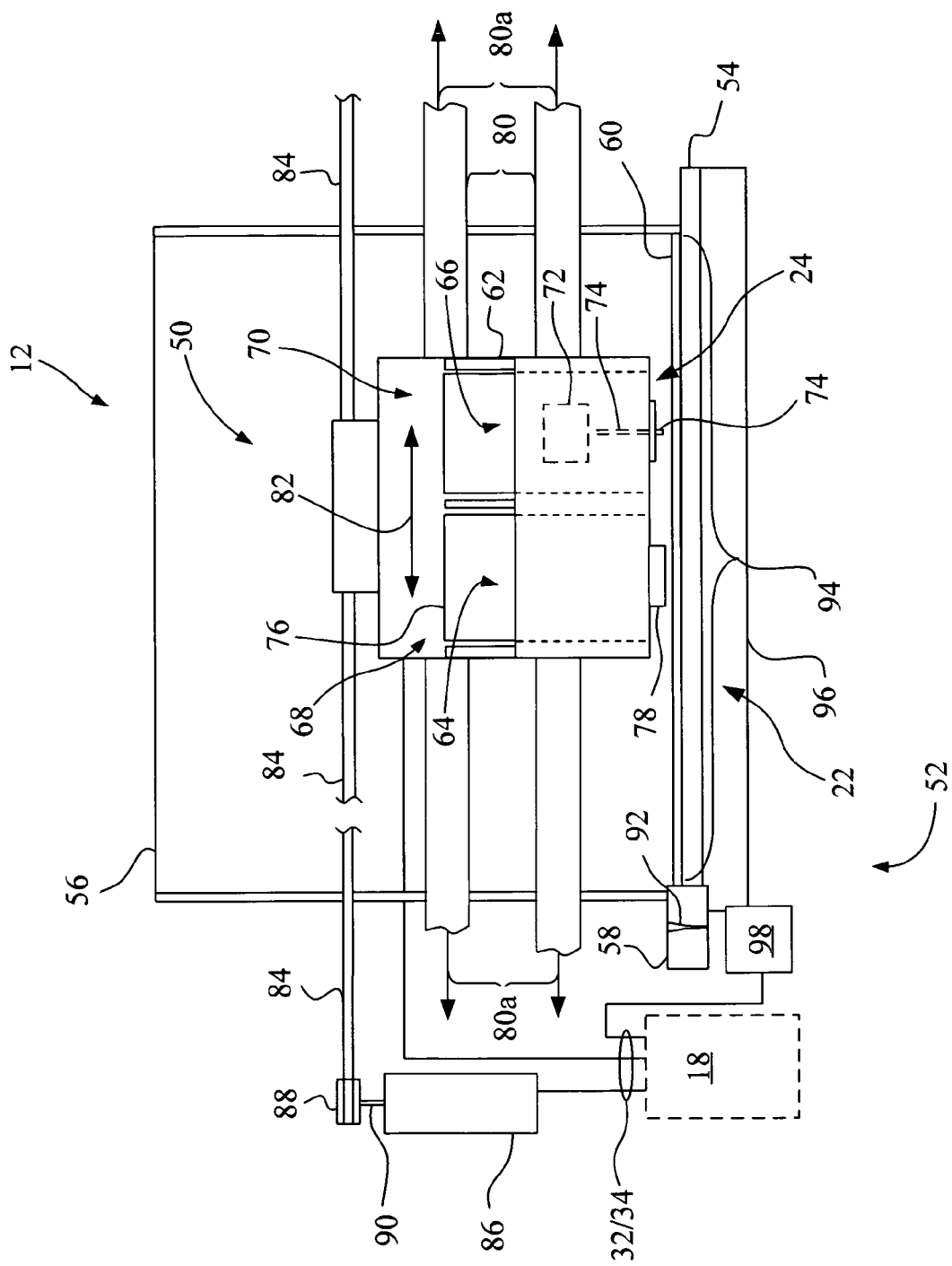
FIG. 2 is a diagrammatic representation of an imaging apparatus configured for use in implementing the present invention.

With the present invention, it may be advantageous in some embodiments for perforator unit 24 to be combined with printing unit 22 in a single imaging apparatus, as shown in FIGS. 1 and 2. However, those skilled in the art will recognize that the principles of the present invention may be achieved in systems where perforator unit 24 is independent from printing unit 22, or where printing unit 22 is not present.

In embodiments including host 14, host 14 may be, for example, a personal computer including a processor 36, a monitor screen 38 and an input device (e.g., keyboard) 40, and further includes such devices as input/output (I/O) interfaces, memory, such as RAM, ROM, NVRAM, and a mass data storage device, such as a hard drive, CD-ROM and/or DVD units. Processor 36 is communicatively coupled to monitor screen 38 via communications link 42. Processor 36 is communicatively coupled to input device 40 via communications link 44. Further, processor 36 is communicatively coupled to controller 18 of imaging apparatus 12 via communication link 16.

FIG. 2 is one exemplary embodiment of imaging apparatus 12, including printing unit 22 and perforator unit 24, which may be used in conjunction with the present invention.

Printing unit 22 and perforator unit 24 collectively include, for example, a carrier system 50, a feed roller unit 52, a mid-frame 54, a media source 56, and a perforator maintenance station 58.

Media source 56 is configured and arranged to supply from a stack of media a sheet of media 60, i.e., an imaging medium, to feed roller unit 52, which in turn further transports the sheet of media 60 during a printing operation and/or a perforation operation.

Carrier system 50 includes a carrier 62, i.e., carriage, that is configured with one or more bays, for example bay 64 and bay 66. Each of bays 64, 66 is mechanically and electrically configured to mount, carry and facilitate one or more types of printhead cartridges 68, such as a monochrome printhead cartridge and/or a color printhead cartridge, and/or a perforator cartridge 70 that includes a perforation mechanism 72 driving a perforation device 74, such as a needle or blade, in a reciprocating manner.

Each printhead cartridge 68 includes an ink reservoir 76 provided in fluid communication with a printhead 78, which may include multiple inkjet nozzle arrays. Multiple printheads may be included on printhead cartridge 68. Perforator cartridge 70 is sized and configured to be mechanically and electrically compatible with the configuration of the printhead cartridges 68 so as to be interchangeable therewith in carrier 62 in one of bays 64 and 66.

Carrier 62 is guided by a pair of guide members 80. Either, or both, of guide members 80 may be, for example, a guide rod, or a guide tab formed integral with the imaging apparatus frame. The axes 80a of guide members 80 define a bi-directional scanning path 82 of carrier 62. Carrier 62 is connected to a carrier transport belt 84 that is driven by a carrier motor 86 via a carrier pulley 88. In this manner, carrier motor 86 is drivably coupled to carrier 62 via carrier transport belt 84, although one skilled in the art will recognize that other drive coupling arrangements could be substituted for the example given, such as for example, a worm gear drive. Carrier motor 86 can be, for example, a direct current motor or a stepper motor. Carrier motor 86 has a rotating motor shaft 90 that is attached to carrier pulley 88. Carrier motor 86 is coupled, e.g., electrically connected, to controller 18 via communications link 32.

Perforator maintenance station 58 includes an abrasive member 92, such as a ceramic material, arranged to receive and sharpen a perforation device 74, such as for example, a needle or a blade.

At a directive of controller 18, carrier 62 is transported in a controlled manner along bi-directional scanning path 82, via the rotation of carrier pulley 88 imparted by carrier motor 86. During printing, controller 18 controls the movement of carrier 62 so as to cause carrier 62 to move in a controlled reciprocating manner, back and forth along guide members 80. In order to conduct perforator maintenance operations, e.g., sharpening, controller 18 controls the movement of carrier 62 to position carrier 62 in relation to perforator maintenance station 58. Printhead 78 is electrically connected to controller 18 via communications link 32. Perforation mechanism 72 is electrically connected to controller 18 via communications link 34.

During a printing/perforation operation, the reciprocation of carrier 62 transports printhead 78 and perforation mechanism 72 across the sheet of media 60 along bi-directional scanning path 82, i.e., a scanning direction, to define a print/perforation zone 94 of imaging apparatus 12. Bi-directional scanning path 82 is parallel with axes 80a of guide members 80, and is also commonly known as the horizontal direction. Controller 18 supplies electrical address and control signals to the ink jetting actuators of printhead 78 to effect the selective ejection of ink from printhead 78. Further controller 18 supplies control signals to perforation mechanism 72 to effect the selective actuation of perforation mechanism 72 for performing perforating or cutting operations using perforation device 74. During each scan of carrier 62, the sheet of media 60 is held stationary by feed roller unit 52. Feed roller unit 52 includes a feed roller 96 and a drive unit 98. The sheet of media 60 is transported through print/perforation zone 94 by the rotation of feed roller 96 of feed roller unit 52. A rotation of feed roller 96 is effected by drive unit 98. Drive unit 98 is electrically connected to controller 18 via communications link 32.

Utilized with respect to imaging apparatus 12 is a software or firmware program including program instructions that function as a driver for printing unit 22 and/or perforator unit 24, and will be referred to herein as a driver 100. Driver 100 may be accessed, for example, by a software or firmware application, such as for example, an image generation application, etc., that is executing on imaging apparatus 12, or by a software application, such as for example, a word processing application, poster making application, etc., that is executing on host 14.

The program instructions of driver 100 may be executed, for example, by processor 36 of host 14 and/or controller 18 of imaging apparatus 12. Driver 100, for example, may process grayscale data, and may include a halftoning unit, an image data formatter and a perforation data formatter. The grayscale data may be chromatic and/or monochromatic data, and may be represented, for example, on a scale of 0 to 255 by an 8-bit value for each data channel, i.e., color channel. The halftoning unit processes the grayscale data to perform halftone data generation for forming print halftone data for use by printing unit 22 and/or to form perforation halftone data for use by perforator unit 24. Driver 100 further processes print and/or perforation commands for use by printing unit 22 and perforator unit 24, respectively.

With respect to perforator unit 24, driver 100 facilitates the selection of a perforation density, which may be selected manually or automatically. Associated with each media type of a plurality of media types is a corresponding maximum perforation density. The maximum perforation density is the upper limit of perforation density that may be used for a particular media type while avoiding media collapse, e.g., unintended media cutting, or unintended tearing with minimal pressure applied. For example, the maximum perforation density associated with a card stock may be higher than the maximum perforation density associated with plain paper.

The maximum perforation density for a particular media type may be automatically selected by using a media type sensor (not shown) in association with driver 100, so as to maximize the maximum perforation density range. Alternatively, the maximum perforation density may be automatically set to a default maximum perforation density. As a further alternatively, a user may manually select the maximum perforation density, or over-ride the automatic selection of the maximum perforation density, for a particular media type, for example, via a selection made at user interface 20 of imaging apparatus 12 or input device 40 of host 14. For example, the user may manually select a maximum perforation density for the particular media type being used, or manually select a desired perforation density for a portion, or all, of the image that is less than the maximum perforation density associated with the particular media type being used.

Figure 3:
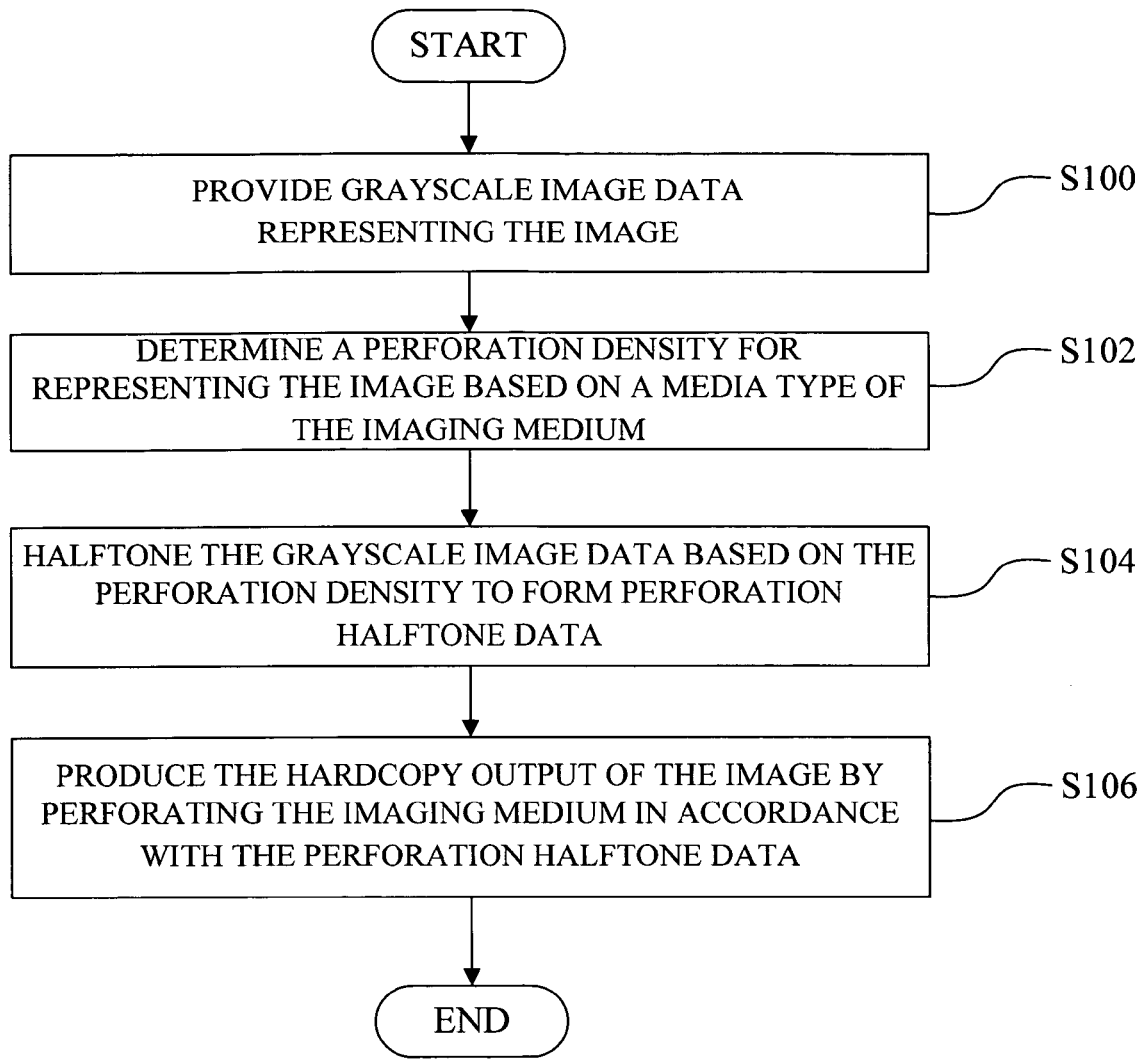
FIG. 3 is a flowchart of an exemplary method in accordance with an embodiment of the present invention to produce a hardcopy output of an image on an imaging medium.

FIG. 3 is a flowchart of an exemplary method in accordance with an embodiment of the present invention, which may be implemented, for example, in a device executing program instructions, such as driver 100, or some other software or firmware, executing on imaging apparatus 12 and/or host 14. The method produces a hardcopy output of an image on an imaging medium, e.g., paper, card stock, thin metal sheet, etc., wherein the hardcopy output of the image is formed at least in part by perforations arranged in single dimensional and/or multidimensional patterns. While printing may also be performed, if desired, in forming the hardcopy output, the present invention contemplates forming the hardcopy output of the image solely using perforations.

At step S100, grayscale image data representing the image is provided, for example, to driver 100. The grayscale data may be chromatic and/or monochromatic data, and may be represented, for example, on a scale of 0 to 255 by an 8-bit value for each data channel, i.e., color channel. In embodiments where the grayscale data is present in multiple data channels, the multiple channels may be processed individually or collectively by driver 100.

At step S102, a perforation density for representing the image is determined based on a media type of the imaging medium. The perforation density selected is limited by a predetermined maximum perforation density associated with the particular media type being used. The maximum perforation density may be selected automatically, and may be set to the maximum perforation density for the particular media type being used, or may be automatically set to a default maximum perforation density. Alternatively, the user may manually select a maximum perforation density for the particular media type being used, or a desired perforation density for a portion, or all, of the image that is less than the maximum perforation density associated with the particular media type being used.

At step S104, the grayscale image data is halftoned based on the perforation density to form perforation halftone data. For example, the grayscale image data may be halftoned at a cell size that is substantially equal to the perforation hole diameter, e.g., about 0.5 millimeters, formed by perforation device 74, e.g., a needle. The perforation halftone data represents, for example, fill areas of the image that are to be perforated using a multidimensional perforation pattern corresponding to the grayscale image data.

At step S106, the hardcopy output of the image is produced by perforating the imaging medium in accordance with the perforation halftone data. The perforating may be performed, for example, by perforator unit 24 under the control of controller 18 of imaging apparatus 12 and/or host 14. Fill areas of the image are perforated using the multidimensional perforation density corresponding to the grayscale image data.

If desired, printing may be performed in conjunction with the perforating. Printing may occur, for example, before, during or after perforating.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method to produce a hardcopy output of an image on an imaging medium, comprising:
   providing grayscale image data representing said image;
   determining a perforation density for representing said image;
   halftoning said grayscale image data based on said perforation density to form perforation halftone data; and
   producing said hardcopy output of said image by perforating said imaging medium in accordance with said perforation halftone data, wherein a maximum perforation density for said perforation density is selected based on a particular media type of said imaging medium being used.

2. The method of claim 1, wherein said perforation density is selected automatically.

3. The method of claim 1, wherein said perforation density is automatically set to a default maximum perforation density.

4. The method of claim 1, wherein said perforation density is manually selected.

5. The method of claim 4, wherein a user manually selects a maximum perforation density for a particular media type of said imaging medium being used.

6. The method of claim 4, wherein a user manually selects a desired perforation density for at least a portion of said image that is less than a maximum perforation density associated with a particular media type of said imaging medium.

7. The method of claim 1, wherein said grayscale image data is halftoned at a cell size that is substantially equal to a perforation hole diameter formed by a perforation device.

8. The method of claim 1, wherein said perforation halftone data represents fill areas of said image that are to be perforated using a multidimensional perforation pattern corresponding to said grayscale image data.

9. The method of claim 1, wherein said perforating is performed by a perforator unit under the control of at least one of a controller of an imaging apparatus and a host.

10. An imaging system configured to produce a hardcopy output of an image on an imaging medium, comprising:
    a perforator unit for perforating said imaging medium; and
    a device having a driver, and communicatively coupled to said perforator unit, said device executing program instructions to perform the acts of:
      receiving grayscale image data representing said image;
      determining a perforation density for representing said image;
      halftoning said grayscale image data based on said perforation density to form perforation halftone data; and
      producing said hardcopy output of said image by perforating said imaging medium in accordance with said perforation halftone data, wherein a maximum perforation density for said perforation density is selected based on a particular media type of said imaging medium being used.

11. The imaging system of claim 10, wherein said perforation density is selected automatically.

12. The imaging system of claim 10, wherein said perforation density is automatically set to a default maximum perforation density.

13. The imaging system of claim 10, wherein said perforation density is manually selected.

14. The imaging system of claim 13, wherein a user manually selects a maximum perforation density for a particular media type of said imaging medium being used.

15. The imaging system of claim 13, wherein a user manually selects a desired perforation density for at least a portion of said image that is less than a maximum perforation density associated with a particular media type of said imaging medium.

16. The imaging system of claim 10, wherein said grayscale image data is halftoned at a cell size that is substantially equal to a perforation hole diameter formed by a perforation device of said perforator unit.

17. The imaging system of claim 10, wherein said perforation halftone data represents fill areas of said image that are to be perforated using a multidimensional perforation pattern corresponding to said grayscale image data.

18. The imaging system of claim 10, wherein said perforating is performed by said perforator unit under the control of at least one of a controller of an imaging apparatus and a host.

19. A method to produce a hardcopy output of an image on an imaging medium, comprising:
providing grayscale image data representing said image;
determining a perforation density for representing said image;
halftoning said grayscale image data based on said perforation density to form perforation halftone data; and
producing said hardcopy output of said image by perforating said imaging medium in accordance with said perforation halftone data, wherein said perforation density is manually selected and wherein a user manually selects a maximum perforation density for a particular media type of said imaging medium being used.

20. A method to produce a hardcopy output of an image on an imaging medium, comprising:
providing grayscale image data representing said image;
determining a perforation density for representing said image;
halftoning said grayscale image data based on said perforation density to form perforation halftone data; and
producing said hardcopy output of said image by perforating said imaging medium in accordance with said perforation halftone data, wherein said perforation density is manually selected and wherein a user manually selects a desired perforation density for at least a portion of said image that is less than a maximum perforation density associated with a particular media type of said imaging medium.

21. An imaging system configured to produce a hardcopy output of an image on an imaging medium, comprising:
a perforator unit for perforating said imaging medium; and
a device having a driver, and communicatively coupled to said perforator unit, said device executing program instructions to perform the acts of:
receiving grayscale image data representing said image;
determining a perforation density for representing said image;
halftoning said grayscale image data based on said perforation density to form perforation halftone data; and
producing said hardcopy output of said image by perforating said imaging medium in accordance with said perforation halftone data, wherein said perforation density is manually selected and wherein a user manually selects a maximum perforation density for a particular media type of said imaging medium being used.

22. An imaging system configured to produce a hardcopy output of an image on an imaging medium, comprising:
a perforator unit for perforating said imaging medium; and
a device having a driver, and communicatively coupled to said perforator unit, said device executing program instructions to perform the acts of:
receiving grayscale image data representing said image;
determining a perforation density for representing said image;
halftoning said grayscale image data based on said perforation density to form perforation halftone data; and
producing said hardcopy output of said image by perforating said imaging medium in accordance with said perforation halftone data, wherein said perforation density is manually selected and wherein a user manually selects a desired perforation density for at least a portion of said image that is less than a maximum perforation density associated with a particular media type of said imaging medium.

* * * * *

UNITED STATES PATENT AND TRADEMARK OFFICE
CERTIFICATE OF CORRECTION

PATENT NO. : 7,619,776 B2 Page 1 of 1
APPLICATION NO. : 11/304115
DATED : November 17, 2009
INVENTOR(S) : Writt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 938 days.

Signed and Sealed this

Twenty-sixth Day of October, 2010

David J. Kappos
*Director of the United States Patent and Trademark Office*